(12) United States Patent  
Keam

(10) Patent No.: US 8,289,300 B2
(45) Date of Patent: Oct. 16, 2012

(54) AMBIENT CORRECTION IN ROLLING IMAGE CAPTURE SYSTEM

(75) Inventor: Nigel Keam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 12/617,963

(22) Filed: Nov. 13, 2009

(65) Prior Publication Data

US 2011/0012866 A1    Jan. 20, 2011

Related U.S. Application Data

(60) Provisional application No. 61/226,443, filed on Jul. 17, 2009.

(51) Int. Cl.
*G06F 3/042* (2006.01)
(52) U.S. Cl. ................................ 345/175; 178/18.11
(58) Field of Classification Search .................. 345/173, 345/175; 178/18.01, 18.03, 18.11
See application file for complete search history.

(56) References Cited

U.S. PATENT DOCUMENTS

| 6,061,177 | A | 5/2000 | Fujimoto |
| 7,453,514 | B2 | 11/2008 | Furlan et al. |
| 2007/0228175 | A1 | 10/2007 | Kotlarsky et al. |
| 2008/0044063 | A1 | 2/2008 | Friedman et al. |
| 2008/0084499 | A1 | 4/2008 | Kisacanin et al. |
| 2008/0150913 | A1* | 6/2008 | Bell et al. ............... 345/175 |
| 2009/0084847 | A1 | 4/2009 | He et al. |
| 2009/0091554 | A1* | 4/2009 | Keam ............... 345/175 |
| 2009/0160944 | A1 | 6/2009 | Trevelyan et al. |

FOREIGN PATENT DOCUMENTS

| JP | 2004309922 A | 11/2004 |
| JP | 2007065656 A | 3/2007 |

OTHER PUBLICATIONS

"International Search Report", Mailed Date: Feb. 28, 2011, Application No. PCT/US2010/042197, Filed Date: Jul. 15, 2010, pp. 9.
Bradley, et al., "Synchronization and Rolling Shutter Compensation for Consumer Video Camera Arrays", retrieved at <<http://www.derekbradley.ca/Papers/procams09_CamSync.pdf>>, pp. 8, 2009.
Titus, Jon, "Filters Improve Images", retrieved at <<http://www.tmworld.com/article/CA6436561.html>>, Test & Measurement World, 2007, pp. 3, May 1, 2007.
"CV-A20 CL / CV-A80 CL Progressive Scan CMOS", retrieved at <<http://www.nuhorizons.com/displays/jai/Datasheet_CV-A20CL-CV-A80CL_PDF_screen.pdf>>, pp. 2.

* cited by examiner

*Primary Examiner* — Adam R Giesy
(74) *Attorney, Agent, or Firm* — Alleman Hall McCoy Russell & Tuttle LLP

(57) ABSTRACT

Embodiments are disclosed that relate to the correction of an image acquired in a rolling image capture system for ambient light. One embodiment provides a device comprising a screen, a rolling image capture system, a local light source, and a controller. The controller is configured to operate the local light source while acquiring first and second frames of image data to integrate each field of image sensor pixels for a duration of local+ambient light and for a duration of ambient light such that a sum $t_{local+ambient} + t_{ambient}$ for the first frame is different than a sum $t_{local+ambient} + t_{ambient}$ for the second frame for each field of pixels. The controller is further configured to determine an ambient light value, and to adjust one or more pixels based upon the ambient light value.

20 Claims, 8 Drawing Sheets

AMBIENT CORRECTION IN ROLLING IMAGE CAPTURE SYSTEM

CROSS-REFERENCE TO RELATED APPLICATIONS

The present application claims priority to U.S. Provisional Application Ser. No. 61/226,443, filed Jul. 17, 2009 and titled "CORRECTING FOR AMBIENT IN ROLLING SHUTTER DEVICE, the entire contents of which are incorporated herein by reference for all purposes.

BACKGROUND

Touch-sensitive devices may detect touch via several different mechanisms, including but not limited to optical, resistive, and capacitive mechanisms. Some optical touch-sensitive devices detect touch by capturing an image of a backside of a touch screen via an image sensor, and then processing the image to detect objects located on the screen. Such devices may include a light source within the device to illuminate the backside of the display screen such that objects on the screen reflect the incident light toward the image sensor, thereby allowing the object to be detected.

One difficulty that may be encountered with optical touch screen devices involves differentiating between external (ambient) light and light reflected from the light source within the device. Ambient light of sufficient brightness may be mistaken for an object touching the device, and therefore may degrade the performance of the device. Further, the use of a rolling image capture system may introduce additional difficulties with correcting an image for ambient light.

SUMMARY

Accordingly, various embodiments are disclosed that relate to the correction of an image acquired in a rolling image capture system for ambient light. For example, one disclosed embodiment provides an optical touch-sensitive device comprising a screen, a rolling image capture system configured to acquire an image of the screen, a local light source configured to illuminate the screen with local light, and a controller in electrical communication with the rolling image capture system and the local light source. The controller is configured to operate the local light source while acquiring first and second frames of image data to integrate each field of image sensor pixels for a duration of local+ambient light and for a duration of ambient light such that a sum $t_{local+ambient} + t_{ambient}$ for the first frame is different than a sum $t_{local+ambient} + t_{ambient}$ for the second frame for each field of pixels. The controller is further configured to determine an ambient light value for a pixel in the image data by one or more of (a) comparing a value of the pixel in the first frame with a value of the pixel in the second frame and (b) comparing the value of the pixel in the first frame with a value of another pixel in the first frame, and to adjust one or more pixels for ambient light based upon the ambient light value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows a schematic depiction of another embodiment of a method of determining an ambient light value from the intensity data of FIG. 4.

FIG. 7 shows a schematic depiction of another embodiment of a method of determining an ambient light value from the intensity data of FIG. 4.

FIG. 8 shows a schematic depiction of another embodiment of a method of determining an ambient light value from the intensity data of FIG. 4.

FIG. 9 shows a schematic depiction of another embodiment of a method of determining an ambient light value from the intensity data of FIG. 4.

DETAILED DESCRIPTION

Figure 1:
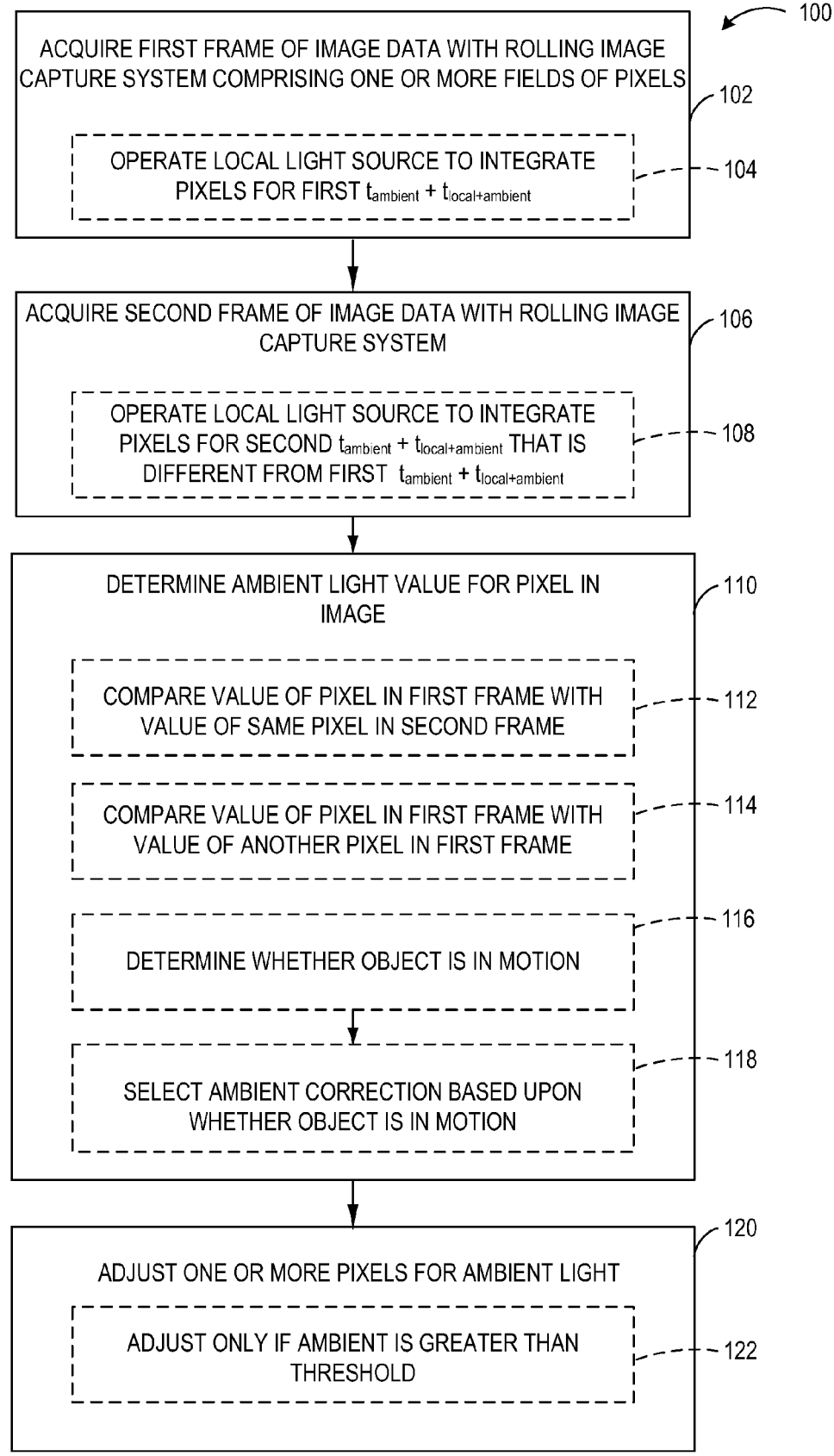
FIG. 1 shows an embodiment of a method of correcting for ambient light in an optical touch-sensitive device.

As described above, ambient light sources, such as room lighting, sunlight, etc., may harm the performance of a vision-based touch detection system. The term "ambient light" is used herein to describe light originating from a source other from a local light source that is part of the vision-based touch system, as described in more detail below. Even where a bandpass filter is used in front of an image sensor to prevent unwanted wavelengths of light from reaching the image sensor, ambient light within the wavelength range transmitted by the bandpass filter may still reach the image sensor. As one specific example, a vision system configured to detect touch via locally emitted infrared light reflected from objects in contact with to a display screen may be affected by infrared light emitted by incandescent room lighting, sunlight, and the like. Ambient light of a sufficient intensity may cause a vision-based touch detection system to mistakenly identify ambient light as a touch input, and/or may result in a reduction in image contrast that makes touch detection more difficult.

Various techniques may be used to cancel or otherwise correct for ambient light in an image captured by an image sensor in a vision-based touch detection system. For example, a local light source may be strobed such that alternate frames are exposed to "ambient" and "ambient+local" light. This allows the ambient light intensity to be determined by subtracting the "ambient" frame from the "ambient+local" frame to correct for ambient. However, because the local light is turned on every other frame, this effectively cuts the frame rate of a device in half, which may increase the difficulty of tracking movement of a touch input.

Another potential technique is to utilize a separate sensor (possibly with an optical filter) configured to integrate ambient light. However, the use of an additional sensor may be expensive, and may be prone to errors due to the different positioning of the sensors in the device. Yet another potential technique may be to utilize an extremely bright local light source in combination with a band-pass filter to boost the intensity of reflected light relative to ambient light. However, this approach may be susceptible to failure where the ambient light exceeds some percentage of local light.

The use of a rolling image capture system to detect touch inputs in a vision-based touch sensing system may introduce additional difficulties in correcting for ambient light. Rolling image capture systems, such as a rolling shutter camera, a rolling sensor-in-panel arrangement (where image sensor pixels are integrated into a display panel, thereby allowing the omission of a separate camera), or the like, capture images by integrating an image sensor progressively across an area of the image sensor. For example, some rolling image capture systems may be configured to progressively integrate an image sensor from a top row of the image sensor to a bottom row of the image sensor. Thus, different pixels of the image sensor begin and end light integration at different times.

Additional challenges in ambient correct may arise in a rolling image capture system due to the different times at which different rows or columns of pixels of a rolling image capture system integrate light. For example, simply turning a single backlight on and off at a 50% time cycle to capture alternating images with and without local lighting may result in the rows of the image sensor integrating local light for different durations, thereby causing difficulties with ambient correction. Further, some pixels may be exposed to equal amounts of local light each frame, thereby preventing ambient correction for those pixels.

Accordingly, FIG. 1 shows a flow diagram of a method 100 for correcting an image for ambient light in a device comprising a rolling shutter image capture system. Method 100 comprises, at 102, acquiring a first frame of image data with a rolling image capture system, wherein the rolling image capture system comprises one or more fields of pixels. As indicated at 104, this may comprise operating a local light source in such a manner as to integrate each field of pixels for a first duration, or total sum, of local+ambient light ($t_{local+ambient}$) and ambient light ($t_{ambient}$). The total sum of these two durations of image sensor pixel integration may be referred to herein as $t_{local+ambient}+t_{ambient}$.

The term a "field of pixels" as used herein represents a group of pixels in which each pixel in a field is integrated for equal durations of local+ambient light ($t_{local+ambient}$) and ambient light ($t_{ambient}$) in a frame of image data. Therefore, in embodiments in which the rolling image capture system comprises a single field of pixels, all pixels of the first frame of image data may be exposed for equal durations of $t_{local+ambient}$ and $t_{ambient}$. Likewise, in embodiments comprising two or more fields of pixels, the first and second fields of pixels in the first frame of image data may be integrated for different total sums of ($t_{local+ambient}+t_{ambient}$). For example, in one specific embodiment, two fields of pixels in a single frame of image data are integrated such that the fields are exposed to different durations of $t_{ambient}$ but similar durations of $t_{local+ambient}$. The two fields may be interlaced fields (for example, odd/even rows or odd/even columns of pixels), or may have any other suitable spatial relationship. Furthermore, in some embodiments, three or more fields of pixels may be exposed for different total sums of ($t_{local+ambient}$ and $t_{ambient}$). Examples of methods to expose different fields of pixels to different durations of $t_{local+ambient}+t_{ambient}$ in a single image frame are described in more detail below. In other embodiments, the rolling image capture system may comprise a single field of pixels.

Next, method 100 comprises, at 106, acquiring a second frame of image data with the rolling image capture system. As indicated at 108, this may comprise operating a local light source to integrate each field of pixels for a second total sum of $t_{local+ambient}+t_{ambient}$ that is different than the first total sum of $t_{local+ambient}+t_{ambient}$ for that field of pixels.

Next, method 100 comprises determining, at 110, an ambient light value for one or more pixels of image data to allow those pixels to be adjusted for ambient light. The ambient light value for a pixel of image sensor data may be determined by comparing the value of the pixel in the first frame of image data and a value of the same pixel in the second frame of image data, as indicated at 112, by comparing the value of the pixel in the first frame of image data to the value of another pixel in the first frame of image data, as indicated at 114, or from a combination of these processes, depending upon the method used to acquire the first and second frames of image data. Further, as indicated at 116 and 118, in some embodiments, it may be determined whether any objects imaged in the frames of image data are in motion between the first and second frame of image data to assist in selecting an ambient value determination, as explained in more detail below.

Method 100 next comprises, at 120, adjusting one or more pixels of image data to correct for the ambient light based upon the ambient light value determined. In some embodiments, the image data may be adjusted if it is first determined, at 122, if the ambient light measure is over a threshold value. Compared to other methods of correcting for ambient light, method 100 allows a correction for ambient light to be made to image data without the use of an additional image sensor or other additional parts, and also without any loss of frame rate.

Figure 2:
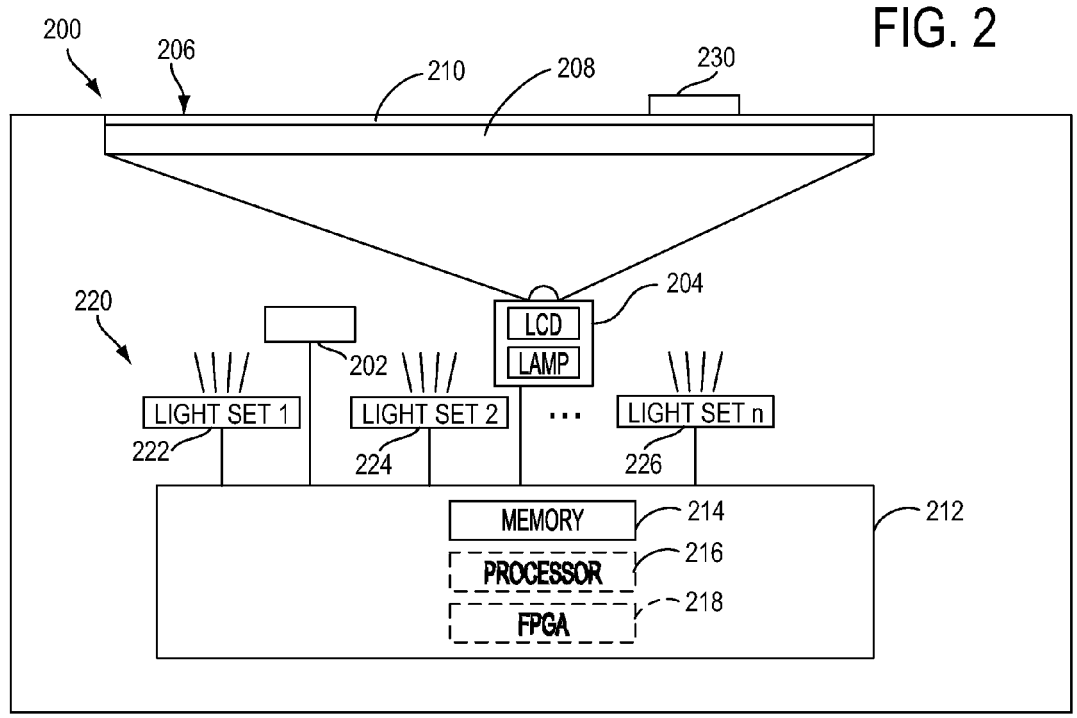
FIG. 2 shows an embodiment of an optical touch-sensitive device comprising a rolling image capture system and a rolling local light source.

Prior to discussing the correction for ambient light in more detail, an embodiment of a suitable use environment is described. FIG. 2 shows an embodiment of an interactive display device 200 comprising a rolling image capture system, shown schematically at 202, such as a rolling shutter camera, a rolling sensor-in-panel arrangement (where image sensor pixels are integrated into a display panel, thereby allowing the omission of a separate camera), or the like. Rolling image capture system 202 captures images by exposing an image sensor progressively across an area of the image sensor, such as from a top horizontal row to a bottom horizontal row of the image sensor, from a left column to a right column, etc. Thus, different pixels of the image sensor begin and end light integration at different times. It will be understood that the term "row" as used herein represents any linear array of sensor pixels, whether arranged vertically, horizontally, diagonally, etc.

Interactive display device 200 further comprises a projection display system having an image source 204 comprising a lamp and an image-producing element, such as the depicted liquid crystal display (LCD) or other suitable image producing element, and a display screen 206 onto which images are projected. While shown in the context of a projection display system, it will be understood that other embodiments may utilize a liquid crystal display panel to present images to a user, or any other suitable image-producing element, rather than a rear projection system.

The depicted display screen 206 includes a transparent portion 208, such as sheet of glass, and a diffuser layer 210 disposed on top of the transparent portion 208. Diffuser layer 210 helps to avoid the imaging of objects that are not in contact with or positioned within a few millimeters of display screen 206, and therefore helps to ensure that objects that are not touching or in close proximity to display screen 206 are not detected. In some embodiments, an additional transparent layer (not shown) may be disposed over diffuser screen layer 210 to provide a smooth look and feel to the display surface. Further, in other embodiments, such as some that utilize a LCD panel rather than a projection image source to display images on display screen 206, diffuser layer 210 may be omitted.

Continuing with FIG. 2, interactive display device 200 further includes an electronic controller 212 comprising memory 214 and a processor 216. Controller 212 may further (or alternatively) include a field programmable gate array (FPGA) 218, and/or any other suitable electronic components, including application-specific integrated circuits (ASICs) (not shown), digital signal processors (DSPs) (not shown), etc. configured to conduct one or more ambient light correction calculations, as described below. While shown as part of controller 212, it will be appreciated that FPGA 218 and/or other electronic components may also be provided as one or more separate devices in electrical communication with controller 212. It will also be understood that memory 214 may comprise instructions stored thereon that are executable by the processor 216 to control the various parts of interactive display device 200 to effect the methods and processes described herein. Likewise, the FPGA 222 also may be configured to perform one or more of the correction methods described in detail below.

To assist in detecting objects and/or touches placed on display screen 206, display device 200 may further include a local light source configured to illuminate display screen 206 with infrared or visible light. Light from the local light source may be reflected by objects placed on display screen 206 and then detected by rolling image capture system 202. In the embodiment of FIG. 2, the local light source comprises a rolling local light source 220 configured to provide local lighting in a spatially rolling pattern synchronized with rolling image capture system 202. The depicted rolling local light source 220 comprises an arbitrary number of individually controllable light sources, illustrated as light set 1 222, light set 2 224, and light set n 226, where each light set may comprise one or more light sources, such as a plurality of infrared LEDs. The use of infrared local light as opposed to visible local light may help to avoid washing out the appearance of images projected on display screen 206. Further, an infrared bandpass filter (not shown) may be utilized to pass light of the frequency emitted by the local light source but prevent light at frequencies outside of the bandpass frequencies from rolling image capture system 202.

Each light set 222, 224, 226 may have any suitable configuration. For example, in some embodiments, each light set 222, 224, 226 may comprise a plurality of relatively thin bands of LEDs, where each band is configured to illuminate a sub-set of rows of pixels of the image sensor. Such bands may be configured to illuminate any desired number of rows or columns of a display screen, and may even comprise a separate set of backlights for each row or column of the display screen. In other embodiments, the rolling local light source 220 may comprise a relatively lesser number of relatively wider bands of LEDs. In yet other embodiments, the rolling local light source 220 may include a mechanically scannable light source configured to scan a band of light across the display screen in synchronization with the rolling image capture system. It will be understood that these examples of rolling local light sources are described for the purpose of example, and are not intended to be limiting in any manner. For example, other light sources than LEDs may be used for each band of light. It further will be understood that the rolling local light source 220 may further comprise any suitable optics for focusing a band of light on a desired subset of rows or columns pixels of a display screen.

FIG. 2 also depicts an object 230 placed on display screen 206. Light from the rolling local light source 220 reflected by object 230 may be detected by rolling image capture system 202, thereby allowing the object 230 to be detected on the screen. Object 230 represents any object that may be in contact with display screen 206, including but not limited to fingers, brushes, optically readable tags, etc.

Figure 3:
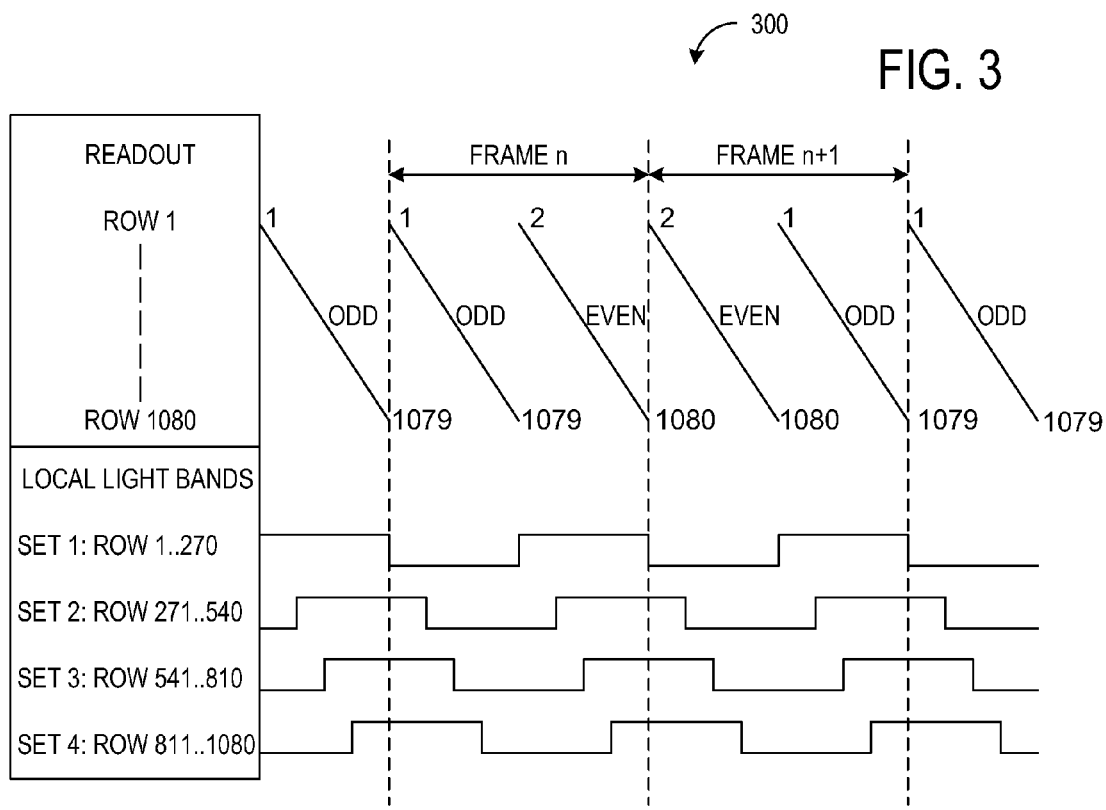
FIG. 3 shows a timing diagram depicting an embodiment of a method for integrating and reading a rolling image capture system in an interactive display device comprising a rolling local light source.

FIG. 3 shows a timing diagram 300 depicting an example of a method of collecting image data to allow for the correction of ambient light that utilizes a rolling image capture system that comprises two fields of pixels. Generally, the embodiment depicted in timing diagram 300 allows a rolling image capture system to acquire a first frame of image data by progressively reading a first field of pixels while illuminating the screen with the rolling local light source and then progressively reading the second field of pixels while not illuminating the screen with the rolling local light source, and acquire the second frame of image data by progressively reading the second field of pixels while illuminating the screen with the rolling local light source and then progressively reading the first field of pixels while not illuminating the screen with the rolling local light source. As will be described below, this allows an image to be corrected for ambient light while preserving the overall frame rate of the device. Timing diagram 300 is shown in the context of a rolling local light source comprising four sets or bands of local light, but it will be understood that any other suitable number of sets of bands of local light may be used.

First referring to image data frame n of FIG. 3, odd rows 1-1079 are read out and reset during a first portion of the frame n readout cycle, and then even rows 2-1080 are read out and reset during a second portion of the frame n readout cycle. Referring next to image data frame n+1, even rows 2-1080 are read out before odd rows 1-1079. This pattern may repeated throughout operation of the rolling image capture system. Along with this readout and reset pattern, the local light sets are cycled such that each set is turned on for approximately one half of an image frame, and then turned off for approximately one half of each frame. Referring again to frame n of FIG. 3, light set 1 turns off at the time row 1 of the image sensor is read and then turns off after all odd rows have been read, approximately halfway through the image n readout cycle. Then, light set 1 turns on for the remainder of the image n readout cycle. Light sets 2, 3 and 4 toggle on and off in a similar manner, except that the toggling of these light sets are synchronized with the readout and reset of rows 271, 541 and 811, respectively.

Next referring to image data frame n+1 of FIG. 3, the light sets are toggled in the same manner as for image data frame n, but the even rows are read out and reset before the odd rows.

In this manner, the even and odd rows of each frame of image data image are exposed to different durations of ambient light, but similar durations of local light. For example, at the time row 1 of frame n+1 is read out and reset, it has been exposed to ambient light for 1.5 integration cycles and to local light for 0.5 integration cycles. In contrast, at the time row 2 of frame n+1 is read out, it has been exposed to ambient light for 0.5 integration cycles and local light for 0.5 integration cycles. In this manner, a single image contains pixels that have been exposed to different durations of ambient light but similar amounts of local light. Further, each field of pixels is also exposed to different total durations of ambient light in frame n compared to frame n+1. The depicted integration and local lighting pattern of FIG. 3 thus allows ambient correct to be performed with intraframe data ("spatial correction") and/or interframe data ("temporal correction").

Figure 4:
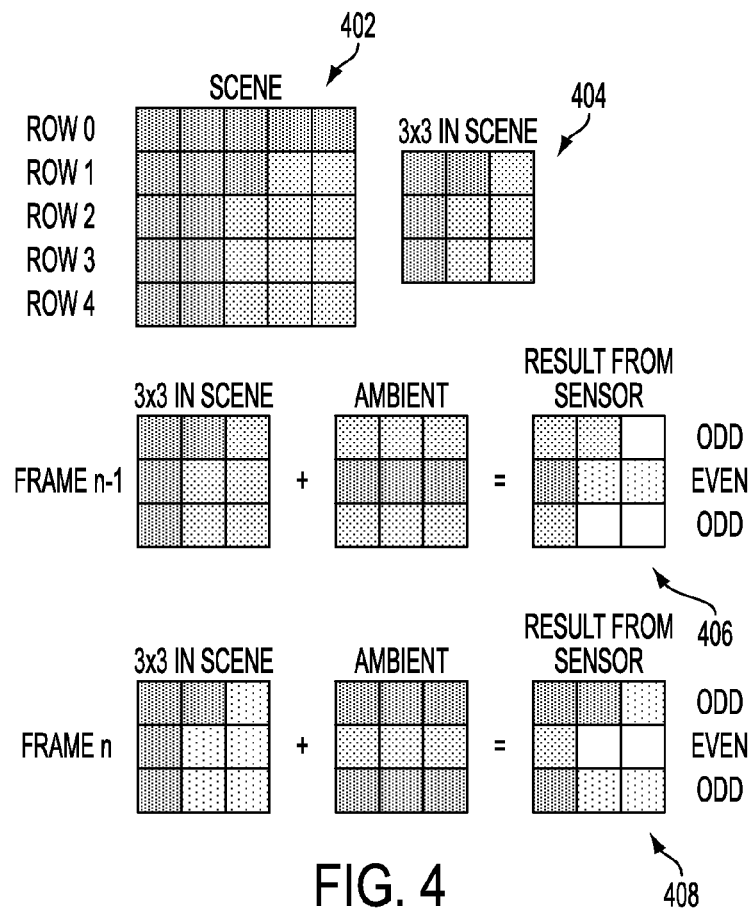
FIG. 4 shows a schematic depiction of intensity data of two fields of pixels in adjacent image frames captured according to the method of FIG. 3.

FIGS. 4-10 illustrate various spatial and temporal correction methods that may be used to correct image data acquired via the method shown in FIG. 3 for ambient light. In order to illustrate various ambient correction methods, a representative group of intensity data from two image frames, labeled frames n−1 and n, are described with reference to FIG. 4. Specifically, FIG. 4 illustrates how the readout from the rolling image capture system for the two image frames, which show a stationary scene, may appear when integrated and read according to the process shown in FIG. 3. First, a simple stationary scene with no ambient light is shown at 402, and a 3×3 matrix of pixels from scene 402 is shown at 404. For the purpose of simplicity, the images in FIG. 4 have three intensity levels, wherein the lightest pixels signify the most integrated light and the darkest pixels signify the least integrated light.

Figure 5:
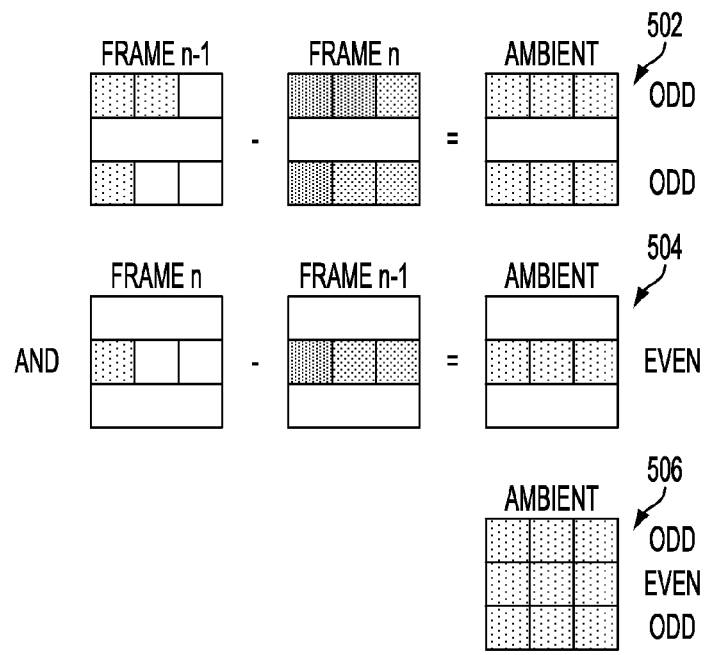
FIG. 5 shows a schematic depiction of one embodiment of a method of determining an ambient light value from the intensity data of FIG. 4.

In frame n−1, the odd rows have a greater duration of ambient exposure than the even rows. The addition of this ambient pattern to the 3×3 scene yields the intensity data shown at 406. Likewise, in frame n, the even rows have a greater duration of ambient exposure than the odd rows. The addition of this ambient pattern to the 3×3 scene yields the intensity data shown at 408. Referring next to FIG. 5, the ambient light can be calculated for the odd rows by subtracting frame n from frame n−1 (as shown at 502), and for the even rows by subtracting frame n−1 from frame n (as shown at 504). Combining the ambient determined for the odd rows with the ambient determined for the even rows yields an overall ambient 506 for the 3×3 matrix.

Figures 6, 7, 8, 9:
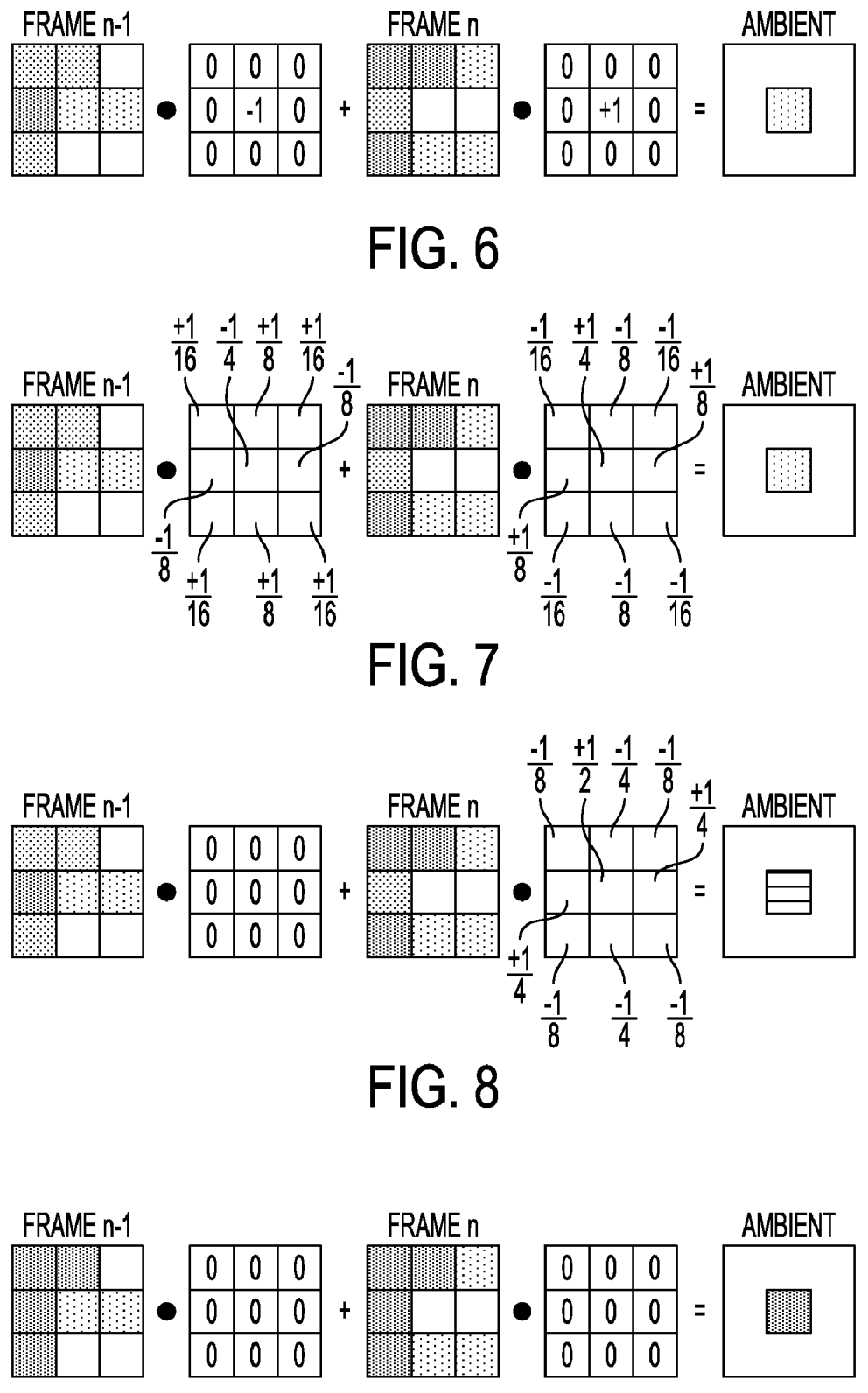

FIGS. 6-8 show examples of various methods that may be used to correct an image frame for ambient light with the image data shown in FIG. 4. These figures are shown in the context of determining ambient for a single pixel at a time. This may allow different ambient calculation methods to be used for different pixels depending upon pixel-specific factors. It will be understood that the illustrated methods may be applied to each pixel in a frame of image data to correct the overall frame of image data for ambient light.

First referring to FIG. 6, an ambient light value at a pixel (for example, the center pixel of the 3×3 matrix shown in FIGS. 4-5) may be calculated as described above for FIG. 5 by simply subtracting frame n−1 from frame n. Likewise, ambient values for pixels in the top and bottom rows of the 3×3 matrix may be determined simply by subtracting frame n from frame n−1. This method utilizes information from temporally adjacent frames but does not utilize information from spatially adjacent pixels. Therefore, the method illustrated in FIG. 6 may be referred to herein as a "temporal-local" correction. However, due to the sensor readout pattern shown in FIG. 3, after subtraction of ambient, the intensity at that pixel is the same as in an adjacent frame. Thus, the temporal-local correction may effectively halve the frame rate of the device. For this reason, this correction may be used for stationary objects.

FIG. 7 shows another example of a method for correcting an image frame for ambient light. As opposed to that shown in FIG. 6, the method shown in FIG. 7 takes into account both temporal information (i.e. temporally adjacent image frames) and spatial information (i.e. spatially adjacent pixels) when calculating the ambient for a pixel. Therefore, the method shown in FIG. 7 may be referred to as a "temporal-spatial" correction. While shown in the context of a 3×3 matrix, it will be appreciated that the concepts shown in FIG. 7, as well as FIG. 8, may be applied to a matrix of any size of pixels and any shape/pattern around the pixel of interest, including but not limited to 5×5 and 7×7 matrices, as well as other shapes (such as a cross-shaped matrix formed by omitting each corner pixel from a 5×5 matrix).

The temporal-spatial correction shown in FIG. 7 utilizes a weighted average intensity of the pixels in the sample matrix to determine an ambient value, wherein the center pixel is weighted more strongly (¼) than the side pixels (⅛ each), which are in turn weighted more strongly than the corner pixels. To perform the correction, the intensities of the pixels are multiplied by the shown weighting factors, the two frames are added, and then the value at each pixel in the matrix after the addition of the two frames is summed to yield the ambient intensity at the center pixel. Because spatial data is taken into account in addition to temporal data, the temporal-spatial correction allows a frame rate to be maintained.

FIG. 8 shows another example of a method for correcting a frame of image data for ambient light. As opposed to the methods shown in FIGS. 6 and 7, the method of FIG. 8 utilizes spatial information, and not temporal information, in making the ambient correction. In other words, the correction is made entirely from a weighted average of intra-frame data, utilizing no inter-frame data. As depicted, this calculation may lead to slightly high values of ambient light, but can avoid calculation problems due to motion that may occur in methods that utilize temporal information.

As mentioned above, in some embodiments it may be determined whether the ambient light exceeds a predetermined threshold level before performing any of the above ambient correction methods. Where ambient light is of sufficiently low intensity or is absent, the touch-sensitive device may be able to detect objects without any problems caused by ambient. Therefore, before performing any of the above-described corrections (or any others), it may be determined whether there is any potentially problematic ambient by comparing the sum of the intensities in the first field in a frame to the sum of the intensities in the second field in the frame. Because the intensities in the two fields differ by the amount of ambient light integrated, if the sums are relatively close together, it can be determined that the ambient light levels are sufficiently low not to interfere with device operation, and adjustment for ambient may be omitted, as shown in FIG. 9.

Figure 10A:
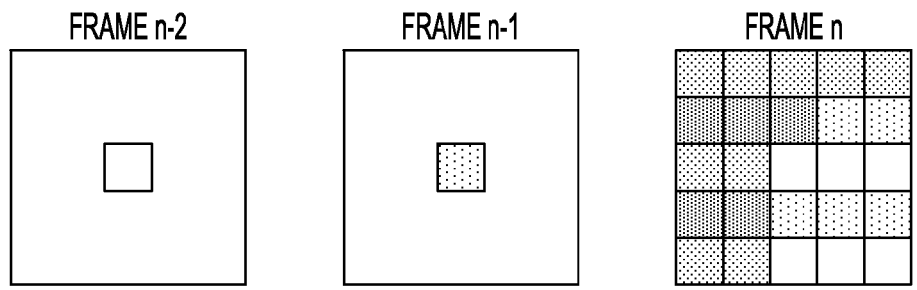
FIGS. 10A-D show a schematic depiction of another embodiment of a method of determining an ambient light value from the intensity data of FIG. 4.
Figure 10B:
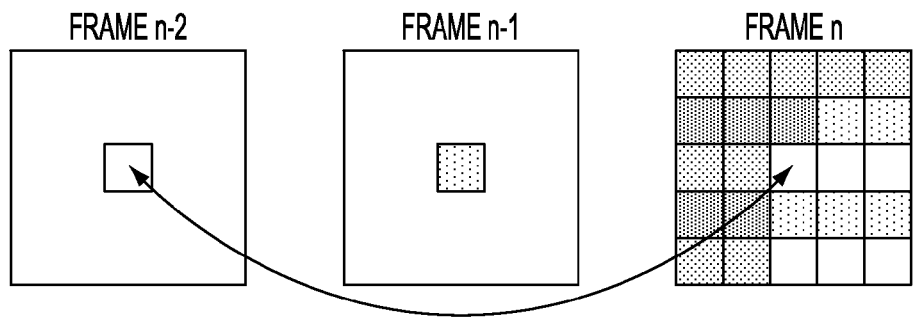

In some embodiments, it may be determined whether any movement of any objects on the display screen 206 has occurred, and then an ambient adjustment method may be selected depending upon whether any movement of any objects is detected. FIGS. 10A-D illustrate an embodiment of a such method for correcting for ambient light. Referring first to FIG. 10A, a 5×5 region of pixels in a current frame of image data (frame n) and a single pixel in two prior frames of image data (frames n−1, n−2) are considered for ambient correction. However, it will be appreciated that a 3×3 region of pixels, or any other suitable region of pixels, in a current frame may be considered in the ambient correction. First referring to FIG.

Figure 10C:
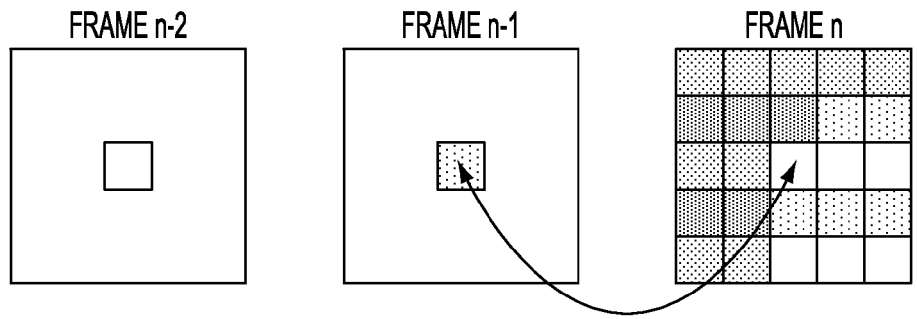

10A, a center of a current frame is compared to a pixel from frame n−2, which was read in the same field order. If the difference between these pixels exceeds a threshold amount, this indicates that motion may have occurred, and a "motion flag" for that pixel is set. The value of the motion flag is compared to motion flags for nearby pixels (for example, via a Boolean "OR" operation), and if the result is zero (i.e. frame n−2 and frame n look the same in a local region), then a temporal ambient correction is performed by determining difference between a current center pixel in frame n and the same pixel in frame n−1, as indicated in FIG. 10C.

Figure 10D:
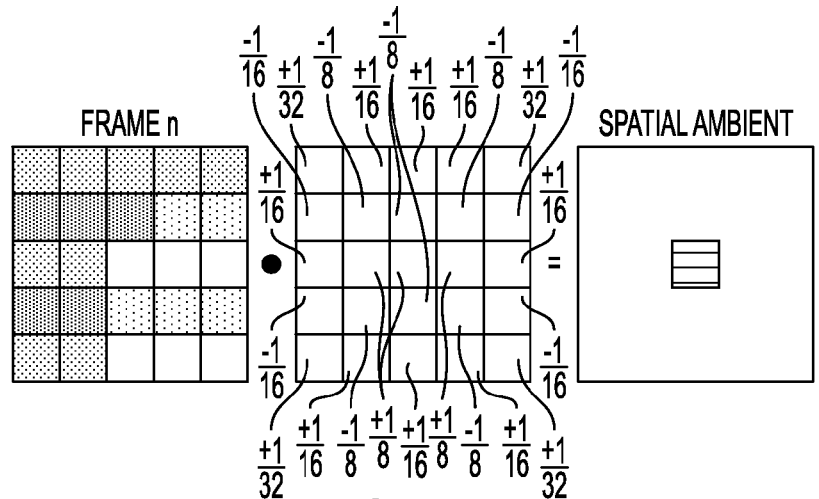

On the other hand, if the OR operation with adjacent motion flags result in a value of 1, this indicates that there may have been some nearby motion in this frame. In this case, prior frames may be ignored for the ambient correction, and a spatial correction utilizing adjacent pixels in frame n is performed. Any suitable weighting factor scheme may be used to perform this spatial correction. FIG. 10D shows one non-limiting example of a suitable weighting factor scheme for a 5×5 pixel spatial correction.

The determination of whether to utilize a 5×5 or a 3×3 pixel region for ambient correction may depend upon factors such as the resolution and stability of the image sensor. For example, a 3×3 region may yield a slightly noisier result, while a 5×5 region may blur the result slightly. Other region sizes may be used, including but not limited to a 1×3 region (which may be noisier than a 3×3 region). It will be understood that these specific examples are presented for the purpose of example, and are not intended to be limiting in any manner.

Figure 11:
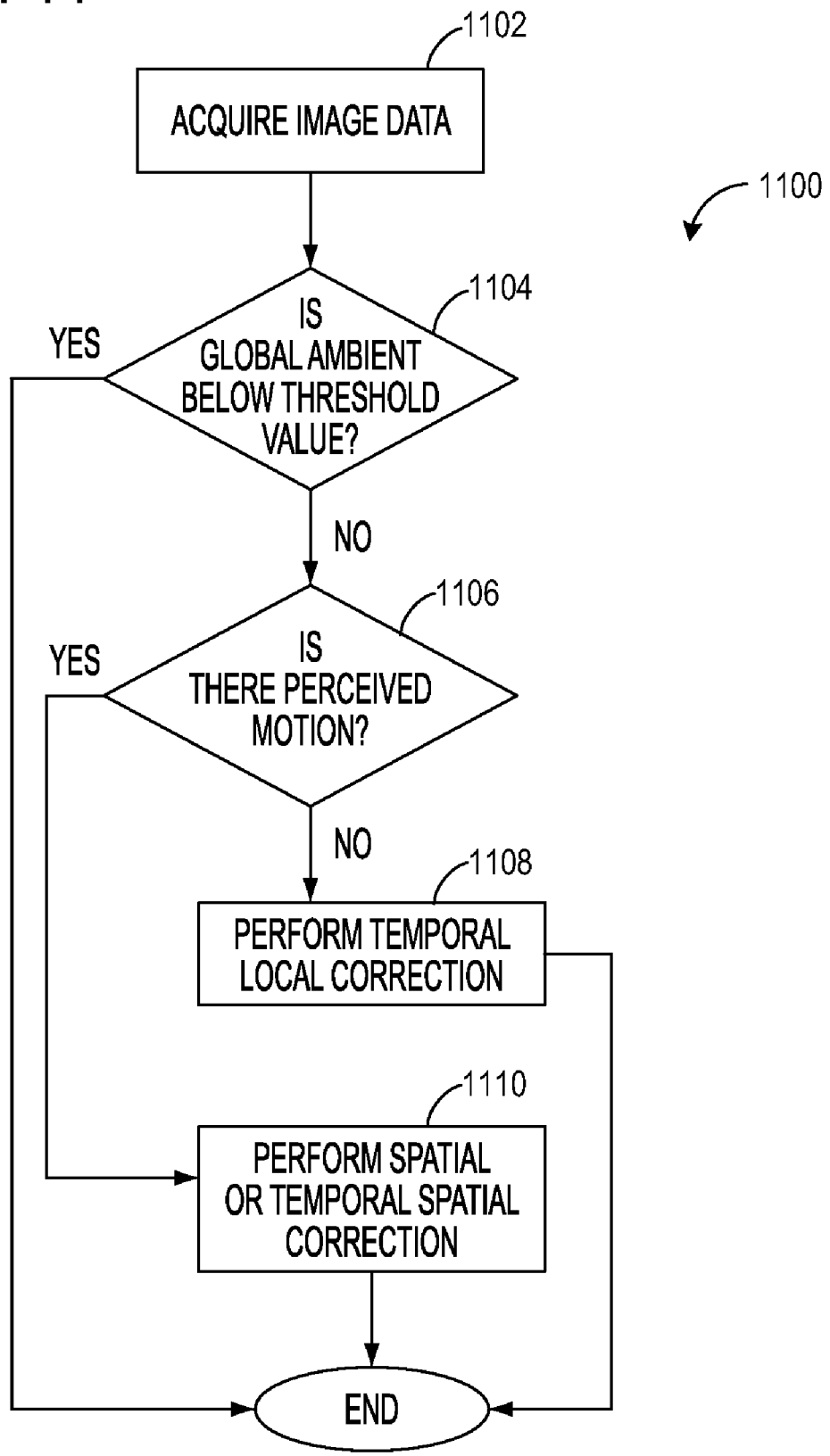
FIG. 11 shows a process flow depicting an embodiment of a method of correcting for ambient light in an optical touch-sensitive device.

FIG. 11 shows a flow diagram depicting a method 1100 for performing an ambient light correction that takes into account the various factors described above. The method of FIG. 11 may be performed on a pixel-by-pixel basis, or in any other suitable manner. Method 1100 first comprises, at 1102, acquiring one or more image data frames, and then, at 1104, determining for an image data frame whether the global ambient is below a threshold value. This can be determined, for example, by subtracting the sum of the intensities of all pixels in a first field from the sum of all intensities of pixels in a second field, and determining if the result of the calculation is below a threshold value.

If the global ambient is below a threshold value, then method 1100 ends without performing any correction. On the other hand, if the global ambient is not below a threshold value, then method 1100 comprises, at 1106, determining whether any motion is perceived in the intensity data. This may be performed, for example, by subtracting the intensity value for the pixel in the current frame (frame n) from the intensity value for the same pixel in frame n−2 (as the same pixel in n−1 has a different ambient exposure time). If the difference between these intensity values is sufficiently small, then it can be determined that the intensity data contains no motion information. In this case, a temporal local correction that utilizes no spatial information may be selected, as indicated at 1108. On the other hand, if the differences between the intensity values is sufficiently large, it can be assumed that the pixel contains motion data (as long as the frame rate has been corrected for any periodically fluctuating ambient light), and either a spatial or a temporal-spatial correction may be selected, as indicated at 1110.

The decision whether to utilize a spatial or temporal-spatial correction may be made in any suitable manner. Generally, a spatial correction may be used where all spatial variation in a frame can be corrected with other information in the frame. One example of a method for making this determination is as follows. First, if any pixels in row (i−1) of the sample matrix differ significantly from the pixels in the same column in row (i+1), there is spatial information that may be corrected via a temporal-spatial correction. Likewise, if any of the pixels in row (i) of the sample matrix minus the mean for row (i) differs significantly from the corresponding pixels in row (i−1) minus the mean for the pixels in row (i−1) then there is spatial information that may be corrected via a temporal-spatial correction. In other cases where there is perceived motion but these conditions are not met, a spatial correction may be used. Alternatively, either a spatial or temporal-spatial may be used exclusive of the other where motion information is contained in a frame.

In addition to the above-described methods of correcting for comparing pixel values to correct for ambient light, various other image processing techniques may be performed in an ambient correction process. For example, image processing may be performed to compensate for light leakage between different light sets, as the light sets may or may not be discretely separated.

The correction calculations and calculation selection routine described above may be performed in any suitable manner. For example, in one embodiment, an FPGA (as shown at 122 in FIG. 1) may be programmed to perform a plurality of different correction calculations simultaneously for each frame. Then, the best ambient value for each pixel in a frame may be selected based upon the specific temporal and local characteristics of that pixel. Alternatively, the best ambient calculation for a pixel may be determined before performing the correction, such that one correction is performed for each pixel. It will be appreciated that these specific examples of how to perform an ambient correction from the intensity data integrated and collected are described for the purpose of illustration, and are not intended to be limiting in any manner.

Figure 12:
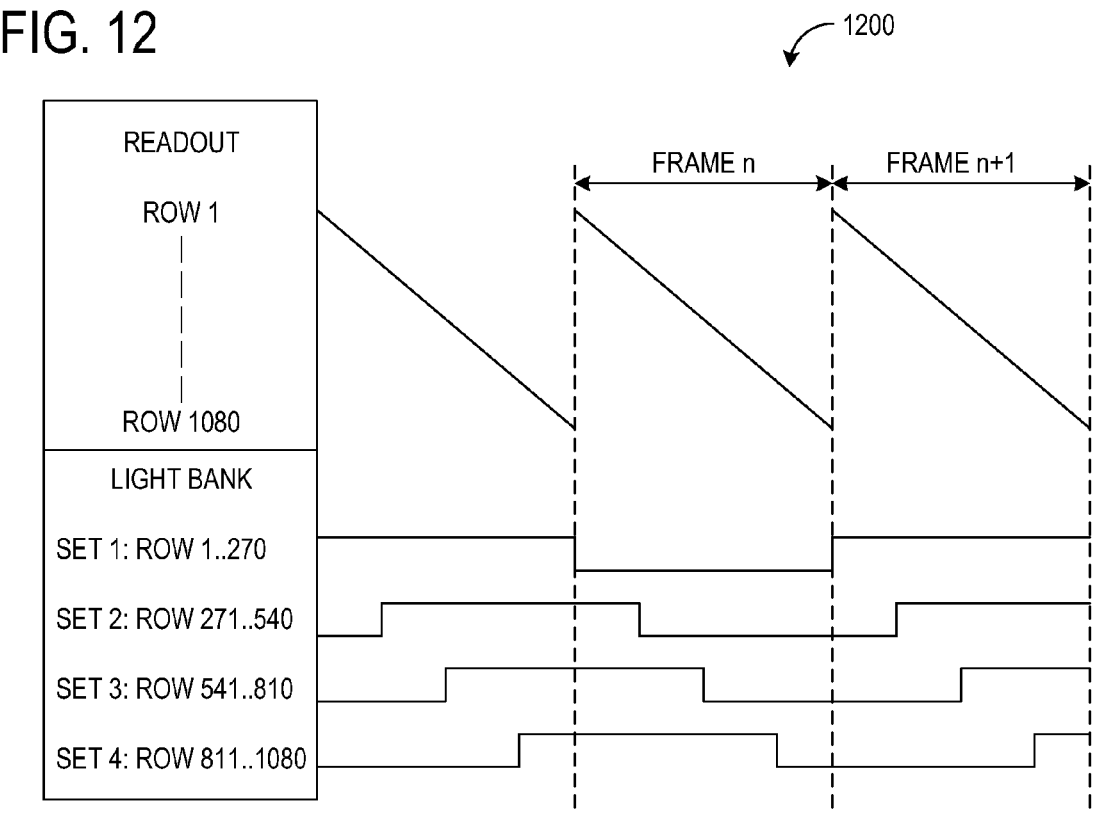
FIG. 12 shows a timing diagram depicting another embodiment of a method for integrating and reading a rolling image capture system in an interactive display device comprising a rolling local light source.

As mentioned above, in some use environments, it may be acceptable to reduce the frame rate when correcting a frame of image data for ambient light. Therefore, rolling local light source 220 may be used to illuminate the display screen with local light every other image frame to allow temporally adjacent image frames to be compared to correct for ambient light. In such an embodiment, rolling image capture system 202 may be considered to have a single field of pixels that is exposed to equal durations of ambient light ($t_{ambient}$) but durations of local+ambient light ($t_{local+ambient}$) in adjacent frames of image data. FIG. 12 shows a timing diagram 1200 that depicts an embodiment of a method for correcting for ambient light in a rolling image capture system via such a method. As with the timing diagram of FIG. 3, timing diagram 1200 depicts illumination cycles for four light sets, and also shows how lighting for 1080 rows of pixels may be divided among the four light sets (i.e. bands of backlight). However, it will be understood that a rolling local light source may comprise any other suitable number of sets of light sets, and may divide the local lighting of the rows or columns of pixels of a display screen in any other suitable manner.

First referring to frame n of FIG. 12, it can be seen that light set 1 turns off when the readout and reset of row 1 occurs, and remains off until the readout and reset of row 1 occurs for frame n+1, at which time the backlight turns on. In this manner, row 1 integrates ambient light for the duration of the frame n readout, and then integrates ambient+local light for the duration of the frame n+1 readout. In this manner, frame n comprises local light+ambient light integrated during the readout cycle before frame n, and frame n+1 comprises ambient light, but no local light, integrated during the readout of frame n. Light sets 2, 3 and 4 are turned on and off in a similar manner, except that the turning off and on of these light sets are synchronized with the readout of rows 271, 541 and 811, respectively.

In this manner, each row of pixels of the image sensor is exposed to an entire frame of ambient+local light, followed by an entire frame of ambient light without local light. Thus, frames n and n+1 may be compared or otherwise mathematically manipulated to correct for ambient light. While the embodiment of FIG. 12 shows alternating frames with local light and with no local light, it will be understood that any other suitable pattern and/or ratio of frames with local light and frames with no local light may be used.

Figure 13:
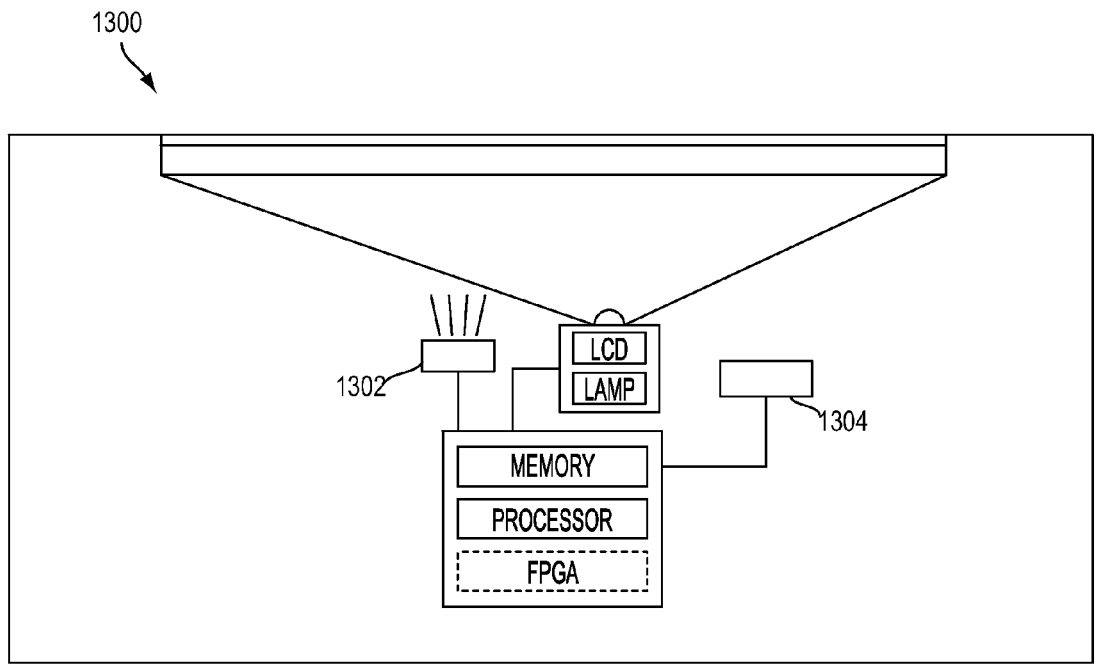
FIG. 13 shows an embodiment of an optical touch-sensitive device comprising a rolling image capture system and a global local light source.

Other embodiments of interactive display devices may comprise a global local light source, rather than a rolling local light source, used in conjunction with a rolling image capture device. FIG. 13 shows an embodiment of such an interactive display device 1300, where the global local light source is indicated at 1302 and the rolling image capture device is illustrated at 1304.

As described above, simply turning a single global local light source on and off at a 50% time cycle to capture alternating images with and without local lighting may result in the rolling image capture system integrating local light for different durations, thereby causing difficulties with ambient correction. Further, some pixels may be exposed to equal amounts of local light each frame, thereby preventing ambient correction for those pixels.

Figure 14:
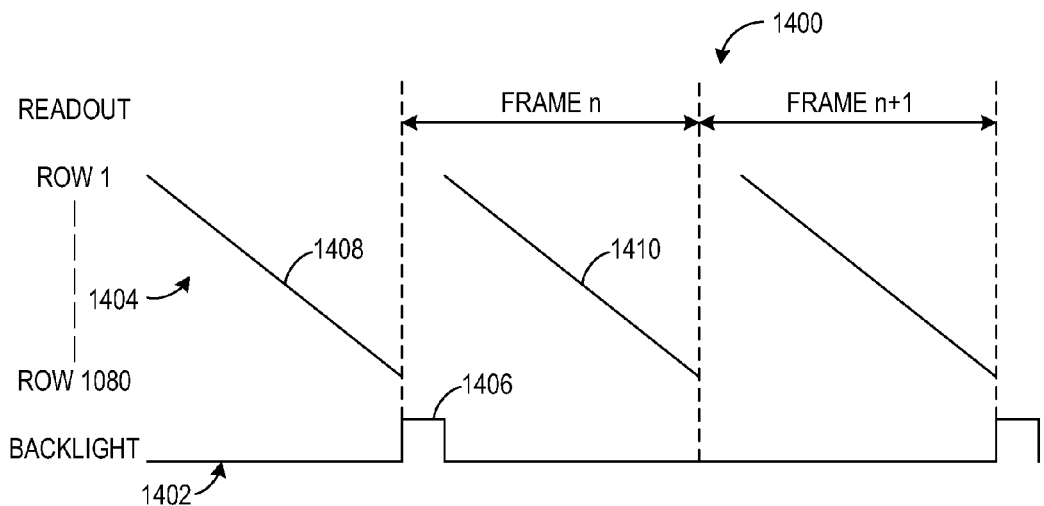
FIG. 14 shows a timing diagram depicting an embodiment of a method of correcting for ambient light in an optical touch-sensitive device comprising a rolling image capture system and a global local light source.

Therefore, FIG. 14 shows a timing diagram 1400 that addresses the problem of exposure to local light for uneven durations by shortening the local illumination to a brief, bright flash of local light, thereby essentially turning the rolling image capture system into a global shutter sensor in terms of local light. In FIG. 14, the local illumination pattern is shown at 1402, and the image sensor readout pattern is shown at 1404, both as a function of time. As depicted, for the acquisition of frame n, the local light source emits a short flash of light 1406 after the completion of a previous readout cycle 1408 and before starting a next readout cycle 1410. In this manner, all pixels of the image sensor may be exposed approximately equally to the local light during the acquisition of image n. On the other hand, the local light source does not emit a similar flash for the acquisition of image n+1. Because the ambient exposure of images n and n+1 occurs for an equal time, images n and n+1 may be used to correct for ambient light by subtraction of the images or other mathematical operation. It will be understood that the integration cycles and/or illumination cycles may be synchronized with any locally oscillating ambient light sources (e.g. incandescent lights with a 60 Hz line frequency) to help to ensure consistent performance.

It will be noted that the ambient correction methods illustrated in FIGS. 12 and 14 may cause a 0.5× decrease in frame rate, as every two images acquired are combined into a single image for object detection. Therefore, in applications where tracking of relatively fast motion is desired, the timing method illustrated in FIG. 3 may be used in conjunction with a spatial ambient correction method to preserve frame rate. Further, while disclosed herein in the context of an interactive display device, it will be appreciated that the disclosed embodiments may also be used in any other suitable optical touch-sensitive device, as well as in any other touch-sensitive device in which a background signal correction may be performed to improve device performance.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optical touch-sensitive device, comprising:
a screen;
a rolling image capture system configured to acquire an image of the screen, the rolling image capture system comprising one or more fields of pixels;
a local light source configured to illuminate the screen with local light; and
a controller in electrical communication with the rolling image capture system and the local light source, wherein the controller is configured to:
acquire a first frame of image data with the rolling image capture system;
acquire a second frame of image data with the rolling image capture system;
while acquiring the first frame of image data and the second frame of image data, operate the local light source such that each field of pixels integrates local+ambient light for a duration $t_{local+ambient}$ and ambient light for a duration $t_{ambient}$, and such that a sum $t_{local+ambient}+t_{ambient}$ for the first frame of image data is different than a sum $t_{local+ambient}+t_{ambient}$ for the second frame of image data for each field of pixels;
determine an ambient light value for a pixel in the image data by one or more of
comparing a value of the pixel in the first frame with a value of the pixel in the second frame, and
comparing the value of the pixel in the first frame with a value of another pixel in the first frame; and
adjust one or more pixels for ambient light based upon the ambient light value.

2. The optical touch-sensitive device of claim 1, wherein the local light source comprises a global local light source, and wherein the controller is configured to:
acquire the first frame of image data and the second frame of image data with the rolling image capture system via a same rolling pattern; and
control the global local light source to expose the screen with local light prior to starting a readout cycle for the first frame of image data, and not to expose the screen with local light prior to starting a readout cycle for the second frame of image data.

3. The optical touch-sensitive device of claim 2, wherein the controller is configured to determine the ambient light value by subtracting the value of the pixel in the second frame from the value of the pixel in the first frame.

4. The optical touch-sensitive device of claim 1, wherein the local light source comprises a rolling local light source configured to provide local lighting in a spatially rolling pattern synchronized with the rolling image capture system.

5. The optical touch-sensitive device of claim 4, wherein the rolling image capture system comprises a single field of pixels, and wherein the controller is configured to:

acquire the first frame of image data and the second frame of image data via a same rolling pattern, and control the rolling local light source to expose the screen to local light while acquiring the first frame of image data, and not to expose the screen to local light while acquiring the second frame of image data.

6. The optical touch-sensitive device of claim 4, wherein the rolling image capture system comprises a first field of pixels and a second field of pixels, and wherein the controller is configured to:

acquire the first frame of image data by progressively reading the first field of pixels while illuminating the screen with the rolling local light source and then progressively reading the second field of pixels while not illuminating the screen with the rolling local light source; and acquire the second frame of image data by progressively reading the second field of pixels while illuminating the screen with the rolling local light source and then progressively reading the first field of pixels while not illuminating the screen with the rolling local light source.

7. The optical touch-sensitive device of claim 6, wherein the first field of pixels comprises odd rows of pixels, and wherein the second field of pixels comprises even rows of pixels.

8. The optical touch-sensitive device of claim 6, wherein the controller is further configured to detect whether any movement of any objects located on the screen has occurred, and then select an ambient adjustment method depending upon whether any movement of any objects is detected.

9. The optical touch-sensitive device of claim 6, wherein the controller is further configured to determine whether the ambient light value exceeds a threshold level, and then to adjust the one or more pixels for ambient light if the ambient light value exceeds the threshold level.

10. The optical touch-sensitive device of claim 4, wherein the rolling local light source comprises a plurality of individually controllable light sources, where each light source is configured to illuminate a portion of the screen.

11. The optical touch-sensitive device of claim 4, where the rolling local light source comprises a mechanically scannable light source.

12. The optical touch-sensitive device of claim 1, wherein the rolling local light source is configured to emit infrared light.

13. An optical touch-sensitive device, comprising:

a screen;

a rolling image capture system configured to acquire an image of the screen, the rolling image capture system comprising one or more fields of pixels;

a rolling local light source configured to provide local lighting in a spatially rolling pattern synchronized with the rolling image capture system; and a controller in electrical communication with the rolling image capture system and the rolling local light source, wherein the controller is configured to:

acquire a first frame of image data with the rolling image capture system;

acquire a second frame of image data with the rolling image capture system;

while acquiring the first frame of image data and the second frame of image data, operate the rolling local light source such that each field of rolling image capture system pixels integrates local+ambient light for a duration $t_{local+ambient}$ and ambient light for a duration $t_{ambient}$, and such that a sum $t_{local+ambient}+t_{ambient}$ for the first frame of image data is different than a sum $t_{local+ambient}+t_{ambient}$ for the second frame of image data for each field of pixels;

determine an ambient light value for a pixel in the image data by one or more of comparing a value of the pixel in the first frame and a value of the pixel in the second frame, and comparing a the value of the pixel in the first frame and a value of another pixel in the first frame; and adjust one or more pixels of the data frame for ambient light based upon the ambient light value.

14. The optical touch-sensitive device of claim 13, wherein the rolling image capture system comprises a single field of pixels, and wherein the controller is configured to:

acquire the first frame of image data and the second frame of image data via a same rolling pattern, and control the rolling local light source to expose the screen to local light while acquiring the first frame of image data, and not to expose the screen to local light while acquiring the second frame of image data.

15. The optical touch-sensitive device of claim 13, wherein the rolling image capture system comprises a first field of pixels comprising odd rows of pixels and a second field of pixels comprising even rows of pixels, and wherein the controller is configured to:

acquire the first frame of image data by progressively reading the first field of pixels while illuminating the screen with the rolling local light source and then progressively reading the second field of pixels while not illuminating the screen with the rolling local light source; and acquire the second frame of image data by progressively reading the second field of pixels while illuminating the screen with the rolling local light source and then progressively reading the first field of pixels while not illuminating the screen with the rolling local light source.

16. The optical touch-sensitive device of claim 13, wherein the rolling local light source comprises a plurality of individually controllable light sources, wherein each light source is configured to illuminate a portion of the screen.

17. The optical touch-sensitive device of claim 13, where the rolling local light source comprises a mechanically scannable light source.

18. In an optical touch-sensitive device comprising a screen, a rolling image capture system comprising a first field of pixels and a second field of pixels, a rolling local light source configured to provide local lighting in a spatially rolling pattern synchronized with the rolling image capture system, and a controller in electrical communication with the rolling image capture system and the rolling local light source, a method of correcting for ambient light, the method comprising:

acquiring a first frame of image data by progressively reading the first field of pixels while illuminating the screen with the rolling local light source and then progressively reading the second field of pixels while not illuminating the screen with the rolling local light source; and after acquiring the first frame of image data, acquiring a second frame of image data by progressively reading the second field of pixels while illuminating the screen with the rolling local light source and then progressively reading the first field of pixels while not illuminating the screen with the rolling local light source;

determining an ambient light value for a selected pixel by one or more of comparing a value of the selected pixel in the first frame of image data and a value of the selected pixel in the second frame of image data and comparing the value of the selected pixel in the first frame of image data and a value of another pixel in the first frame of image data; and adjusting one or more pixels of image data for ambient light based upon the ambient light value.

19. The method of claim 18, wherein illuminating the screen with the rolling local light source comprises illuminating the screen with infrared light.

20. The method of claim 18, wherein illuminating the screen with the rolling local light source comprises illuminating the screen by toggling a plurality of individually controllable light sources in a rolling manner, where each light source is configured to illuminate a portion of the screen.

* * * * *